3,615,117
ANTISAIL TARPAULIN
Paul E. Neidlinger, Akron, Ohio, assignor to East Akron Tarp & Ratchet Mfg. Co., Inc., Akron, Ohio
Filed Aug. 25, 1969, Ser. No. 852,780
Int. Cl. B60p 7/00
U.S. Cl. 296—100
15 Claims

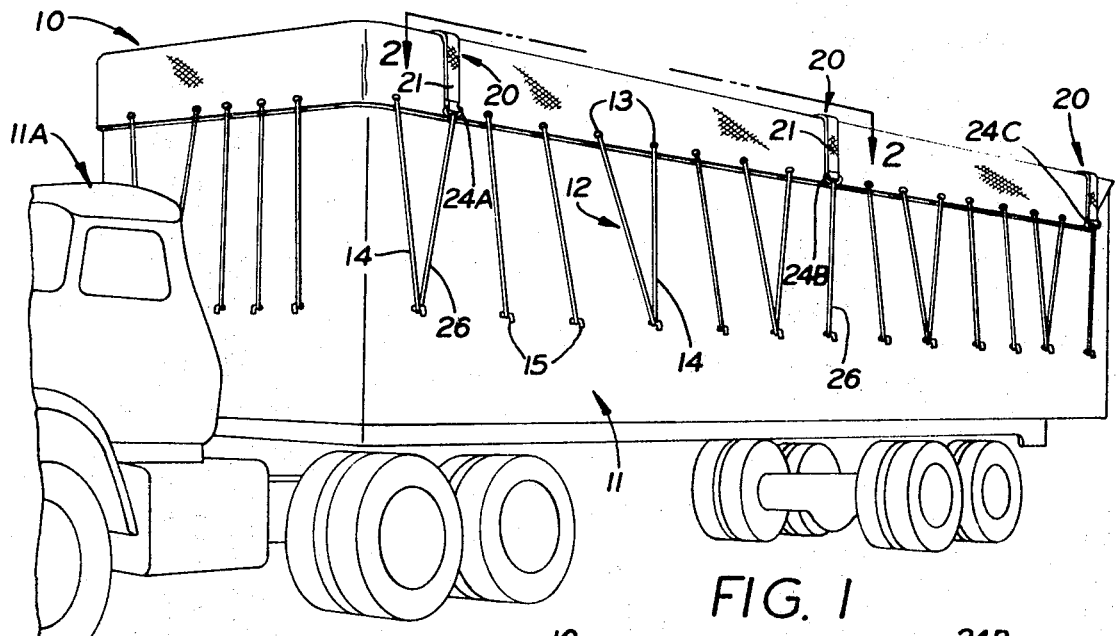
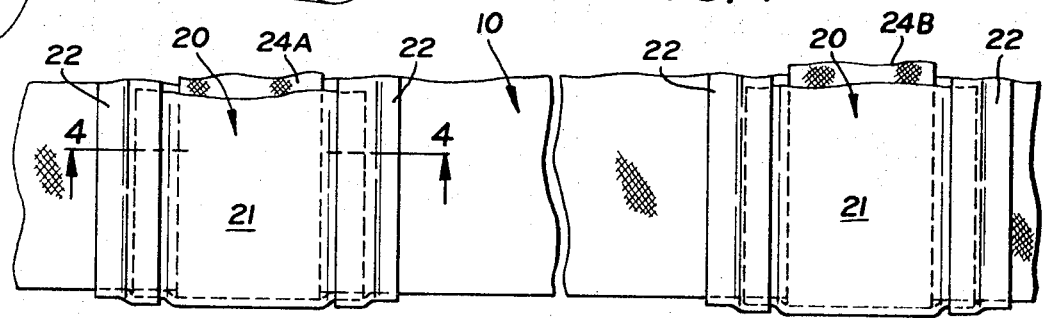
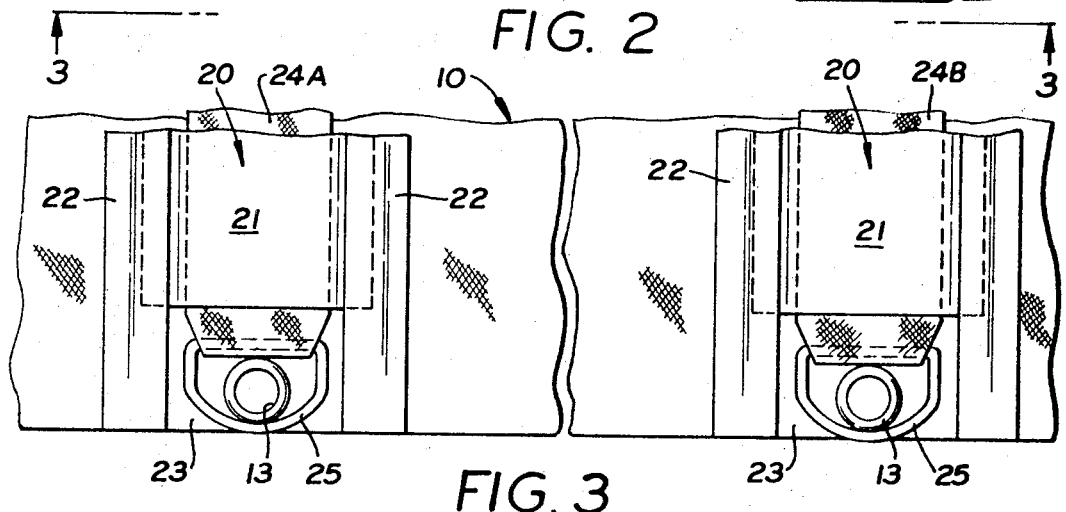
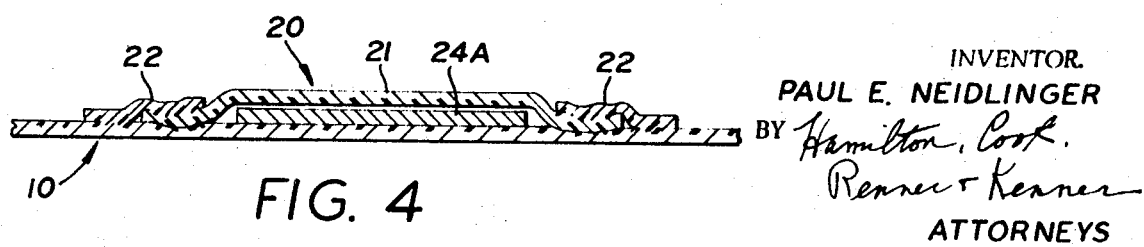
INVENTOR.
PAUL E. NEIDLINGER
BY Hamilton, Cook,
Renner & Kenner
ATTORNEYS United States Patent Office 3,615,117
Patented Oct. 26, 1971

ABSTRACT OF THE DISCLOSURE

A tarpaulin for use primarily on open top trailers is fastened to the trailer in a standard manner. The top of the tarpaulin, however, is provided with at least two laterally extending pockets open at both ends and spaced longitudinally along the tarpaulin at points found to bellow due to air pockets formed thereunder during use. A flat strap having a connecting means at each ends is threaded through each laterally extending pocket. The strap is then pulled tightly against the trailer and fastened thereto to prevent the occurrence of air pockets under the tarpaulin.

BACKGROUND OF THE INVENTION

This invention relates to a tarpaulin used primarily on open top trailers. More particularly, this invention relates to a tarpaulin having a novel means of attachment to a trailer so as to avoid the bellowing which occurs during over-the-road travel.

Open top trailers, such as semitrailers which are transported over the road by truck tractors, are often used for shipping materials which are too large to fit through the door of a conventional closed trailer. When such goods are shipped over the highway or railways (in the case of the now popular "piggyback" system) tarpaulins are required to cover the open top to protect the goods from the elements and to protect the public by assuring that the goods remain in the trailer.

The tarpaulins are generally fastened to the semitrailer by a series of ropes, chains or other resilient roping which extends from spaced grommets provided in the tarpaulin to tiebars or hooks positioned along the sides of the semitrailer. While these types of attachment means are acceptable for some purposes, such as short trips at low speeds, it has been found that in certain instances, they are ineffective for many reasons.

For example, under highway travel conditions, open top semitrailers often carry goods across the country at relatively high and constant speeds. During such travel, air is allowed to accumulate under the tarpaulins and often large bellows appear, most often at the front and rear of the trailer. The constant force of the movement of air beneath the tarpaulins has been known to rip and at times completely tear off the tarpaulins. No solution has until now proved satisfactory. While increasing the number of fastening means attaching the tarpaulin to the trailer would achieve a more desirable airtight seal, this is neither economically nor practically feasible, for ideally an infinite number of fastening means would be required.

When piggyback transportation facilities are used, that is, when loaded semitrailers are carried on railroad flatcars, railroad officials have required that the fastened down tarpaulins be further attached by ropes which are thrown over the top and tied around the trailer. The ropes utilized for this purpose are quite heavy, difficult and time consuming to install, and not inexpensive to stock. The railway yardman must see to it that the ropes extend completely around each trailer binding the tarpaulin thereto before they are loaded onto the flatcars.

When properly installed, these ropes have been known to provide an acceptable method of overcoming some of the aforementioned problems. However, their utilization creates more problems. First and foremost, use of these ropes on extended trips tends to abrade the contact areas of the costly tarpaulins. Secondarily, trucking shippers not only find themselves stocking tarpaulins, and also vast quantities of costly rope (which are usually disposed of at the end of a trip).

SUMMARY OF THE INVENTION

It is thus a primary object of the present invention to provide as an article of manufacture a tarpaulin which can be easily and securely attached to a trailer without damage to the tarpaulin itself.

It is another object of the present invention to provide a tarpaulin, as above, which can be attached to a trailer so as to prevent the occurrence of air pockets which might damage the tarpaulin.

It is still another object of the present invention to provide a tarpaulin, as above, which includes an attachment means integral therewith for ease of handling.

It is a further object of the present invention to provide a tarpaulin, as above, which can be attached to a trailer in a manner meeting the requirements imposed during railroad piggyback travel.

It is a still further object of the present invention to provide a tarpaulin, as above, which can be economically securely attached to a trailer.

These and other objects which will become apparent from the following specification are accomplished by means hereinafter described and claimed.

In general, a tarpaulin constructed according to the concept of the present invention has flat straps positioned within pockets provided on the outer surface of the tarpaulin. The pockets are located at points where air is most likely to be trapped along the length of the tarpaulin and extend laterally across the width of the tarpaulin. The straps, which can be made of any durable material such as nylon, are provided with rings at the ends thereof, which rings are secured by a fastening means to the sides of the trailer. Other portions of the perimeter of the tarpaulin are attached to the truck trailer in a standard manner.

BRIEF DESCRIPTION OF THE DRAWINGS

FIG. 1 is an elevational view showing a tarpaulin constructed according to the concept of the present invention in its environment fastened to a semitrailer.

FIG. 2 is an enlarged partial top plan view of a tarpaulin, according to the concept of the present invention, taken substantially along line 2—2 of FIG. 1.

FIG. 3 is an enlarged partial side elevational view of a tarpaulin according to the concept of the present invention, taken substantially along line 3—3 of FIG. 2.

FIG. 4 is an enlarged sectional view taken substantially along line 4—4 of FIG. 2.

DESCRIPTION OF THE PREFERRED EMBODIMENT

A tarpaulin constructed according to the concept of the present invention is indicated generally by the numeral 10 and is shown in FIG. 1 as covering an open top semitrailer 11 of the standard type. Such semitrailers can be hauled over the highways by tractor trucks, such as indicated by numeral 11A, can be loaded onto flatcars and transported by rail or, more recently, can be loaded directly onto ships for overseas delivery.

Whatever the transportation means, each semitrailer 11 is covered with a tarpaulin 10 manufactured as indicated by the shading in FIG. 4 of a vinyl coated nylon or other thermoplastic material. Standard tarpaulins are provided with a primary connecting means indicated generally by the numeral 12 and includes a series of spaced grommets 13 extending around the perimeter of tarpaulin 10. A rope or other fastening means 14 is provided for each grommet 13. Ropes 14 are pulled tightly and tied or fastened to hooks 15 or tie bars located along the side of semitrailer 11. Where severe or extended use is not involved, the primary connecting means 12 described hereinabove should hold tarpaulin 10 on semitrailer 11.

However, when semitrailers are moved at high speeds on highways or railways, the air flow above a tarpaulin 10, connected only through means 12, will create two conditions. First, a certain amount of air will accumulate under tarpaulin 10, putting severe stresses on the connecting means 12. It has been found that these conditions occur near the front and rear of the semitrailer. Second, a vacuum tends to exist near the longitudinal center of the semitrailer which pulls the tarpaulin inwardly at that point again putting undue stresses on the tarpaulin and its connecting means.

In order to eliminate these stresses, the applicant provides a plurality of pocket means indicated generally by the numeral 20 and extending laterally across the width of the tarpaulin, being spaced along the longitudinal length thereof. Each pocket 20 consists of a strip of material 21 which is electrically or chemically sealed on each edge with strips 22 to the top of tarpaulin 10. The strip 21 is usually made of the same material as the tarpaulin, that is, most typically, a vinyl coated nylon. As best seen in FIG. 3, each strip of material 21 does not extend the entire width of tarpaulin 10, but rather is terminated slightly inwardly of the edge of the tarpaulin, leaving a portion 23 of the tarpaulin exposed between the extremities of the electro-welded strips 22.

Threaded within each pocket 20 and extending through the open ends thereof are flat scraps 24A, 24B and 24C which can be of nylon or other similar material much like a seat belt in present day automobiles. At the ends of each strap 24 there is provided a connecting means such as a D-ring 25. A rope 26 or other fastener is utilized to attach the straps via D-rings 25 to the hook 15. When straps 24 are fully tightened, the "draw string" effect thereof will hold the tarpaulin in place during the most severe conditions.

As shown in FIG. 3, the grommets 13 are spaced so that one appears at each exposed portion 23 of tarpaulin 10. This is merely a convenience to the user so that during periods of non-use or during shipment from the tarpaulin manufacturer, the D-rings 25 can be fastened in any suitable manner to the tarpaulin 10 through grommets 13. This prevents the strap 24 from becoming unthreaded.

Without intending to be limited by exact dimensions, the applicant has found that the ideal number of pocket and strap combinations on a single tarpaulin is three. While standard tarpaulins for semitrailers range in size from 26 feet 6 inches to 45 feet in length, the same longitudinal spacing has been found to solve the above-noted problems no matter what the size.

As shown in FIGS. 1 and 2, strap 24A is located near the front of the semitrailer 11. It has been found that a point 32 inches back from the front is the ideal location to eliminate the bellowing previously described. Strap 24B is located at or very near the center of the tarpaulin and serves to hold it very taut across the width of trailer 11 and therefore preclude the aforementioned vacuum suction effect. Strap 24C is located very near the back of the trailer 11, in practice some 7½ inches away. It is at this location where further bellowing tends to occur.

It should thus be evident that a tarpaulin constructed according to the above description can be economically manufactured to increase tarpaulin life and otherwise accomplish the objects of the present invention.

I claim:

1. An article for covering trailers and the like including a tarpaulin and means to preclude damage to said tarpaulin due to undesirable stresses on said tarpaulin, said means comprising, pocket means extending laterally across said tarpaulin, said pocket means being attached to a surface of said tarpaulin, strap means positioned within said pocket means, and means to connect each end of said strap means to the trailer, said means to preclude damage to said tarpaulin due to undesirable stresses being located at not more than essentially three longitudinal spaced positions along said tarpaulin, one said position being proximate to the center of the longitudinal extent of said tarpaulin when said tarpaulin is positioned on the trailer.

2. An article according to claim 1, a second said position along said tarpaulin being approximately 32 inches from the front of the trailer when said tarpaulin is positioned on the trailer.

3. An article according to claim 2, a third said position along said tarpaulin being approximately 7½ inches from the back of the trailer when said tarpaulin is positioned on the trailer.

4. An article according to claim 1, a second said position along said tarpaulin being approximately 7½ inches from the back of the trailer when said tarpaulin is positioned on the trailer.

5. An article according to claim 1 wherein said pocket means comprises a strip of material electrically sealed to said tarpaulin.

6. An article according to claim 1 wherein said strap means is slidably received within said pocket means.

7. An article according to claim 1 wherein said strap means comprises a flat nylon strap and said means to connect each end of said strap means to the trailer includes a D-ring.

8. An article according to claim 1 wherein said means to connect each end of said strap means to the trailer includes a tie bar adapted to be fixed to the side of the trailer.

9. An article according to claim 1 wherein said means to conect each end of said strap means to the trailer includes rope means.

10. An article for covering trailers and the like including a tarpaulin and means to preclude damage to said tarpaulin due to undesirable stresses on said tarpaulin, said means comprising, pocket means extending laterally across said tarpaulin, said pocket means being attached to a surface of said tarpaulin, strap means positioned within said pocket means, and means to connect each end of said strap means to the trailer, said means to preclude damage to said tarpaulin due to undesirable stresses being located at not more than essentially three longitudinally spaced positions along said tarpaulin, one said position being approximately 32 inches from the front of the trailer when said tarpaulin is positioned on the trailer.

11. An article according to claim 10, a second said position along said tarpaulin being approximately 7½ inches from the back of the trailer when said tarpaulin is positioned on the trailer.

12. An article according to claim 10 wherein said strap means is slidably received within said pocket means.

13. An article according to claim 10 wherein said means to connect each end of said strap means to the trailer consists of D-ring means fixed to each end of said strap means, tie bar means fixed to said trailer and fastening means connecting said D-ring means to said tie bar means.

14. An article for covering trailers and the like including a tarpaulin and means to preclude damage to said tarpaulin due to undesirable stresses on said tarpaulin, said means comprising, pocket means extending laterally across said tarpaulin, said pocket means being attached to a surface of said tarpaulin, strap means positioned within said pocket means, and means to connect each end of said strap means to the trailer, said means to preclude damage to said tarpaulin due to undesirable stresses being located at not more than essentially three longitudinally spaced positions along said tarpaulin, one said position being approximately 7½ inches from the back of the trailer when said tarpaulin is positioned on the trailer.

15. An article according to claim 14, wherein said strap means is slidably received within said pocket means.

References Cited
UNITED STATES PATENTS

| | | | |
|---|---|---|---|
| 877,350 | 1/1908 | Long | 280—37 |
| 1,356,541 | 10/1920 | McGregor | 296—136 |
| 2,807,499 | 9/1957 | Duddleston | 296—100 |
| 3,494,658 | 2/1970 | Maes | 296—100 |
| 3,521,927 | 7/1970 | Barry | 296—100 |

FOREIGN PATENTS

| | | | |
|---|---|---|---|
| 340,183 | 12/1930 | Great Britain | 296—137 |

BENJAMIN HERSH, Primary Examiner

W. H. DOUGLAS, Assistant Examiner

U.S. Cl. X.R.

296—137 B